(12) United States Patent
Ling et al.

(10) Patent No.: US 9,425,887 B2
(45) Date of Patent: *Aug. 23, 2016

(54) METHOD AND SYSTEM FOR MOBILE DELIVERY OF BROADCAST CONTENT

(71) Applicant: Maxlinear, Inc., Carlsbad, CA (US)

(72) Inventors: Curtis Ling, Carlsbad, CA (US); Timothy Gallagher, Encinitas, CA (US); Glenn Chang, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,889

(22) Filed: Aug. 18, 2015

(65) Prior Publication Data

US 2016/0036516 A1 Feb. 4, 2016

Related U.S. Application Data

(63) Continuation of application No. 13/596,852, filed on Aug. 28, 2012, now Pat. No. 9,113,302.

(60) Provisional application No. 61/595,654, filed on Feb. 6, 2012.

(51) Int. Cl.
*H04H 20/74* (2008.01)
*H04B 7/185* (2006.01)
(Continued)

(52) U.S. Cl.
CPC ............ *H04B 7/185* (2013.01); *H04B 7/18515* (2013.01); *H04B 7/18523* (2013.01);
(Continued)

(58) Field of Classification Search
CPC ......... H04H 40/90; H04H 20/74; H04N 7/20; H04B 7/18513; H04B 7/18523; H04B 7/18515; H04B 7/18563; H04B 7/18537; H04B 7/0617

USPC ........... 455/3.02, 3.05, 11.1, 12.1, 13.1–13.3, 455/507, 517, 550.1, 561, 562.1
See application file for complete search history.

(56) References Cited

U.S. PATENT DOCUMENTS 5,329,590 A 7/1994 Pond
9,113,302 B2 * 8/2015 Ling ..................... H04H 20/08
(Continued)

FOREIGN PATENT DOCUMENTS

EP 1494353 A3 1/2006
WO 2009143082 A1 11/2009
WO 2011033342 A1 3/2011

OTHER PUBLICATIONS

Int'l Search Report and Written Opinion for PCT/US13/24966 dated Apr. 22, 2013.

(Continued)

*Primary Examiner* — Nhan Le
(74) *Attorney, Agent, or Firm* — McAndrews Held & Malloy Ltd.

(57) ABSTRACT

A satellite dish assembly may comprise a broadcast receive module and a basestation module. The broadcast receive module may be operable to receive a satellite signal, recover media carried in the satellite signal, and output the media. The basestation module may be operable to accept the media output by the broadcast receive module and transmit the media in accordance with one or more wireless protocols. In being conveyed from the broadcast receive module to the basestation, the media content may not traverse any wide area network connection. The one or more wireless protocols may comprise one or more of: a cellular protocol and IEEE 802.11 protocol. The satellite dish assembly may comprise a routing module that may be operable to route data between the broadcast receive module, the basestation, and a gateway.

18 Claims, 5 Drawing Sheets

(51) Int. Cl.

| | | |
|---|---|---|
| H04W 84/10 | (2009.01) | |
| H04H 40/90 | (2008.01) | |
| H04N 21/45 | (2011.01) | |
| H04N 21/61 | (2011.01) | |
| H04H 20/08 | (2008.01) | |
| H04N 21/643 | (2011.01) | |
| H04W 4/02 | (2009.01) | |
| H04N 21/41 | (2011.01) | |
| H04N 21/4363 | (2011.01) | |
| H04N 21/4405 | (2011.01) | |
| H04N 21/434 | (2011.01) | |
| H04N 21/438 | (2011.01) | |
| H04N 21/4408 | (2011.01) | |
| H04N 21/441 | (2011.01) | |
| H04N 21/4627 | (2011.01) | |
| H04J 4/00 | (2006.01) | |
| H04W 76/04 | (2009.01) | |
| H04L 12/741 | (2013.01) | |
| H04L 29/12 | (2006.01) | |
| H04W 84/04 | (2009.01) | |
| H04W 88/08 | (2009.01) | |
| H04W 88/16 | (2009.01) | |
| H04H 60/21 | (2008.01) | |
| H04H 60/23 | (2008.01) | |

(52) U.S. Cl.
CPC .......... *H04B 7/18526* (2013.01); *H04H 20/08* (2013.01); *H04H 40/90* (2013.01); *H04J 4/00* (2013.01); *H04L 45/74* (2013.01); *H04L 61/2007* (2013.01); *H04N 21/4126* (2013.01); *H04N 21/4343* (2013.01); *H04N 21/4382* (2013.01); *H04N 21/43637* (2013.01); *H04N 21/441* (2013.01); *H04N 21/4405* (2013.01); *H04N 21/4408* (2013.01); *H04N 21/4524* (2013.01); *H04N 21/4627* (2013.01); *H04N 21/61* (2013.01); *H04N 21/6143* (2013.01); *H04N 21/6193* (2013.01); *H04N 21/64322* (2013.01); *H04W 4/023* (2013.01); *H04W 76/04* (2013.01); *H04W 84/042* (2013.01); *H04W 84/10* (2013.01); *H04W 88/08* (2013.01); *H04W 88/16* (2013.01); *H04H 60/21* (2013.01); *H04H 60/23* (2013.01)

(56) References Cited

U.S. PATENT DOCUMENTS

| | | | |
|---|---|---|---|
| 2001/0018341 | A1 | 8/2001 | Dao et al. |
| 2002/0154055 | A1 | 10/2002 | Davis et al. |
| 2002/0160809 | A1 | 10/2002 | Sorrells et al. |
| 2003/0060156 | A1* | 3/2003 | Giaccherini ....... H04B 7/18508 455/3.01 |
| 2003/0203717 | A1 | 10/2003 | Chuprun et al. |
| 2005/0240758 | A1 | 10/2005 | Lord et al. |
| 2006/0048208 | A1 | 3/2006 | Sibley et al. |
| 2006/0209882 | A1 | 9/2006 | Han et al. |
| 2006/0262222 | A1 | 11/2006 | Monnier et al. |
| 2007/0049192 | A1 | 3/2007 | Hoffmann et al. |
| 2008/0060024 | A1 | 3/2008 | Decanne |
| 2008/0101304 | A1 | 5/2008 | Alfred et al. |
| 2009/0007189 | A1 | 1/2009 | Gutknecht et al. |
| 2009/0081944 | A1 | 3/2009 | Yavuz et al. |
| 2009/0113492 | A1 | 4/2009 | Norin et al. |
| 2009/0233596 | A1* | 9/2009 | Calabrese ............... H04W 4/18 455/426.1 |
| 2009/0285150 | A1* | 11/2009 | Ravishankar ...... H04B 7/18543 370/316 |
| 2010/0034181 | A1 | 2/2010 | Shinozaki |
| 2011/0158149 | A1 | 6/2011 | Mugulavalli et al. |
| 2011/0312320 | A1 | 12/2011 | Moeglein |
| 2012/0042345 | A1 | 2/2012 | Tjio et al. |

OTHER PUBLICATIONS

European Search Report for EP 12003194 dated Aug. 24, 2012.

* cited by examiner

METHOD AND SYSTEM FOR MOBILE DELIVERY OF BROADCAST CONTENT

CLAIM OF PRIORITY

This patent application is a continuation of U.S. patent application Ser. No. 13/596,852, filed on Aug. 28, 2012, which makes reference to, claims priority to, and claims benefit from U.S. Provisional Patent Application Ser. No. 61/595,654 entitled "Method and System for an Internet Protocol LNB (IP LNB)" filed on Feb. 6, 2012.

The above-identified application is hereby incorporated herein by reference in its entirety.

INCORPORATION BY REFERENCE

This patent application also makes reference to:
U.S. Pat. No. 8,466,850 entitled "Method and System for Multi-Service Reception" and filed on Jul. 11, 2012;
U.S. Pat. No. 9,055,329 entitled "System and Method in a Broadband Receiver for Efficiently Receiving and Processing Signals" and filed on Dec. 14, 2011;
U.S. Pat. No. 8,700,449 entitled "Targeted Advertisement in the Digital Television Environment" and filed on Oct. 30, 2007.

Each of the above-identified applications is hereby incorporated herein by reference in its entirety.

TECHNICAL FIELD

Aspects of the present application relate to electronic communications. More specifically, to a method and system for mobile satellite content.

BACKGROUND

Existing methods and systems for delivering terrestrial and/or satellite broadcast content to mobile devices can be inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for mobile delivery of broadcast content, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "module" refers to functions than can be performed by one or more circuits. As utilized herein, the terms "e.g.," and "for example" introduce a list of one or more non-limiting examples, instances, or illustrations.

Figure 1:
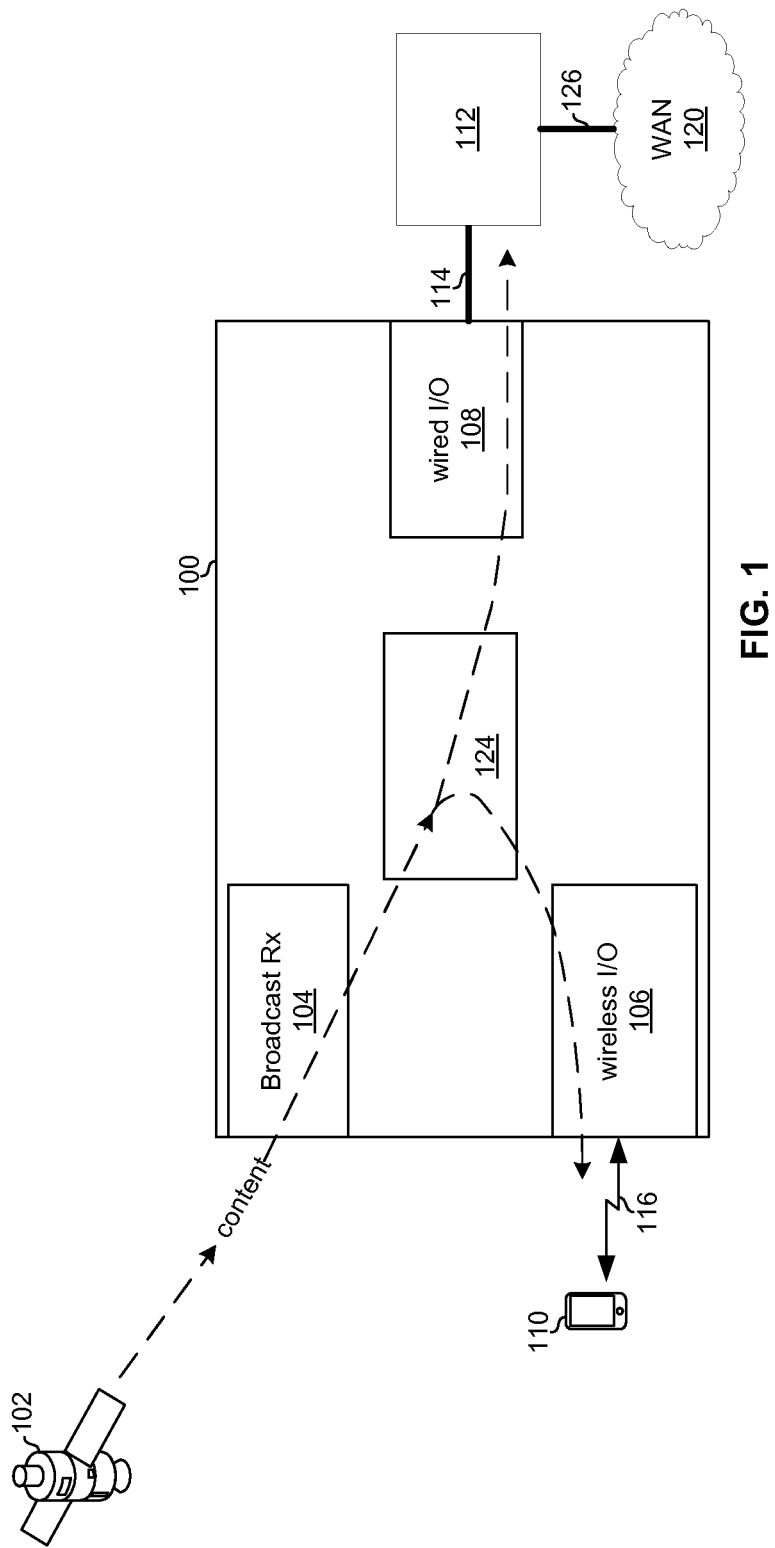
FIG. 1 depicts a system that is operable to convey satellite data to mobile devices.

FIG. 1 depicts a system that is operable to convey satellite data to mobile devices. Referring to FIG. 1, the system 100 comprises a broadcast receive module 104, a wireless input/output (I/O) module 106, a wired I/O module 108, and a routing module 124.

Figure 2A:
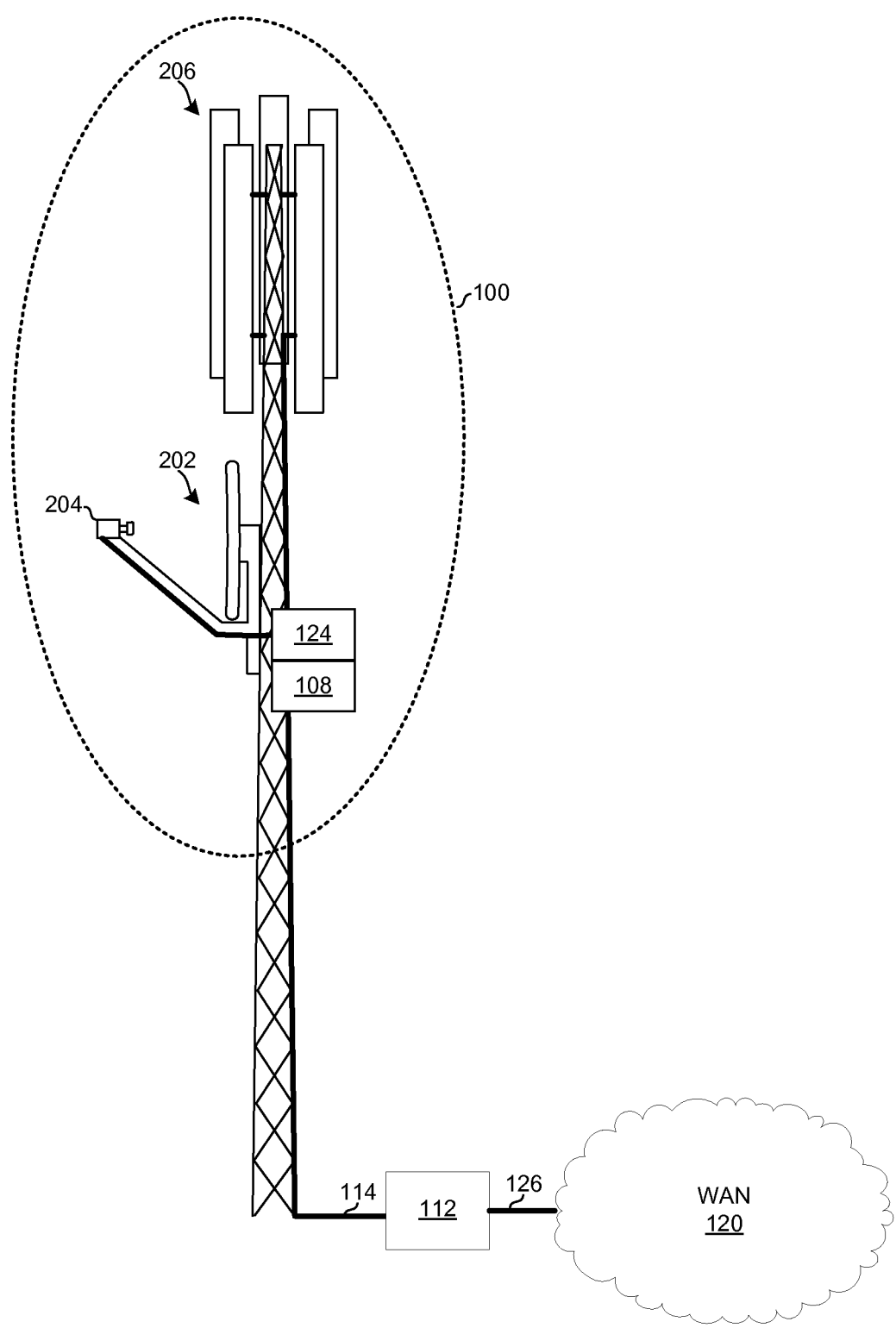
FIG. 2A depicts an example implementation of the system of FIG. 1 in which the system comprises a macrocell basestation.
Figure 2B:
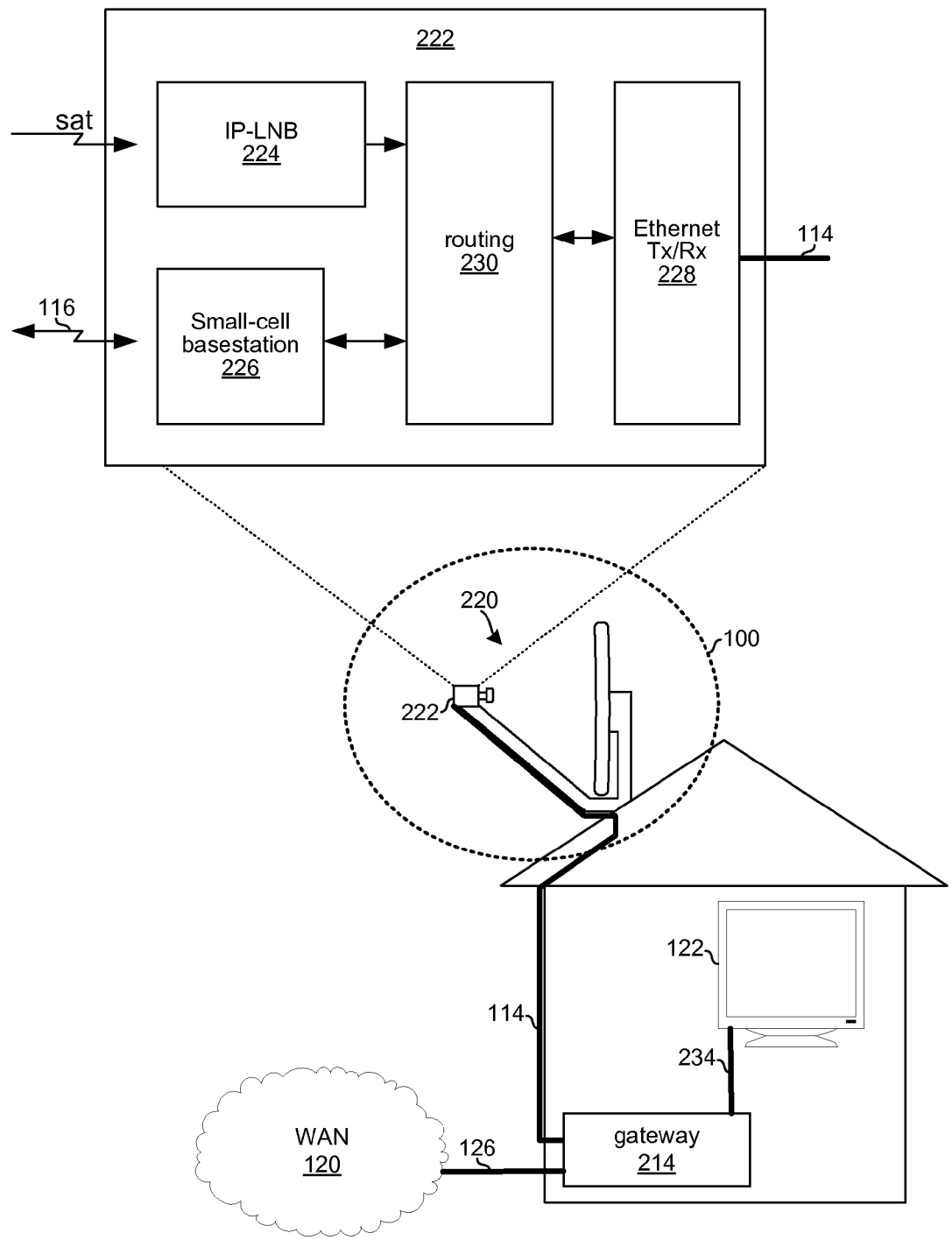
FIG. 2B depicts an example implementation of the system of FIG. 1 in which the system comprises a small-cell basestation.

The various components of the system 100 and the module 112 may be collocated on, for example, a cellular tower as shown in FIG. 2A, a satellite subscriber premises (e.g., a house, multi-dwelling unit, or business) as shown in FIG. 2B, and/or any other suitable location such as roadside buildings or billboards. The system 100 may comprise one or more printed circuit boards and/or one or more integrated circuits (e.g., one or more silicon die).

The system 100 and the module 112 may be part of a local area network (LAN) and may be interconnected via a LAN technology such as Ethernet (e.g., Ethernet frames communicated over an Ethernet physical layer such as 10/100/1G/10G/40GBASE-T). In an example implementation, each port of the system 100 and the port of module 112 that connects to system 100 may share a common subnet address that is not shared with the port of the module 112 that connects to the WAN 120. The module 112 may interface the LAN to a wide area network (WAN) 120 over WAN connection 126 utilizing, for example, DOCSIS, DSL, Carrier Ethernet, ATM, Frame Relay, ISDN, x.25, and/or other suitable WAN technology. The WAN 120 may, for example, backhaul traffic between wireless I/O module 106 and a cellular core network.

The broadcast (e.g., satellite broadcast) receive module 104 may be operable to receive broadcast signals and process the received broadcast signals to recover data (e.g., audio, video content, and/or auxiliary data related to audio and/or video content) carried therein. Although this disclosure focuses on satellite radio and satellite television broadcast signals, the present invention is not so limited. Rather, other types of signals such as terrestrial broadcast television signals are contemplated. Accordingly, various implementations of the system 100 may comprise features described in U.S. patent application Ser. No. 13/546,704 which is incorporated herein by reference as set forth above. In an example implementation, the module 104 may perform channelization such that specific channels, streams, programs, etc. from the module 104 can be selectively conveyed to the module 124. In an example implementation, the module 104 may output data in the form of MPEG transport stream(s) to the module 124. In an example implementation, the module 104 may encapsulate received data utilizing one or more protocols (e.g., Internet Protocol) for output to the module 124.

The wireless module 106 may be operable to establish one or more wireless connections 116 with one or more devices such as the mobile device 110 (e.g., a cellular handset). The connection(s) 116 may utilize any suitable protocol(s) such as, for example, IEEE 802.11 protocols, WiGig, WiMAX, cellular (e.g., LTE), etc.

The wired module 108 may be operable to communicate data via one or more cables 114, with module 112. The module 112 (e.g., a media gateway and/or edge router) may, in turn, route traffic between the system 100 and one or more other devices (e.g., client devices connected to the gateway and/or interior network nodes connected to the gateway). In an exemplary implementation, the wired I/O module 108 may be operable to output, onto the cable(s) 114, L-band signals received from the module 104. Such signals may be output in instances that the module 112 is a legacy gateway. Additionally or alternatively, the module 108 may be operable to communicate over the cable(s) 114 utilizing Ethernet, Multimedia over Coax Alliance (MoCA), and/or any other suitable protocol(s). Such communications may be used, for example, when the module 112 is a gateway that is compatible with an IP-LNB as described in U.S. patent application Ser. No. 13/326,125, which is incorporated by reference above.

In another exemplary implementation, the module 112 may support a wireless connection and the functionality of the wired module 108 may be subsumed by the module 106 and/or by a second wireless module.

The routing module 124 may be operable to selectively route data and/or signals between the modules 104, 106, and 108. The routing may be based, for example, on IP addresses, TCP/UDP port numbers, packet identifiers (PIDs), stream identifiers, and/or any other suitable field or information. For example, packets comprising a first PID may be sent to the module 106 and packets comprising a second PID may be sent to the module 108. In an example implementation, the module 124 may be a digital and/or analog crossbar. In an example implementation, the module 124 may perform an OSI layer-3 packet-routing function and/or an OSI layer-2 packet-switching function. The module 124 may be configured via one or more control signals (not shown) which may, in turn, be based on input (e.g., utilizing a protocol such as DiSEqC) from the module 112 and/or client devices such as the client device 122 and client device 110.

In operation of an example implementation, the broadcast Rx module 104 may receive a satellite signal and perform block down conversion to generate an L-band signal. The L-band signal may be conveyed to the module 108 for support of legacy gateways. The module 104 may also demodulate the L-band signal to recover one or more MPEG transport streams, channelize the transport stream(s) to recover one or more programs, and encapsulate the stream(s) and/or program(s) into one or more packet streams (e.g., utilizing IP or some other suitable protocol(s)). The one or more packet streams may be conveyed, via module 124, to the module 106 and/or the module 108.

The module 108 may decapsulate, encode, modulate, encrypt, and/or otherwise process the transport stream(s) to generate signals suitable for transmission via the cable(s) 114. The module 108 may transmit the generated signals via the cable(s) 114.

The module 106 may encode, modulate, and/or otherwise process the transport stream(s) to generate signals suitable for transmission via the connection(s) 116. The module 106 may then transmit the generated signals via the connection(s) 116. Thus, the system 100 may enable delivering satellite data to the mobile device 110 without the data having to traverse the WAN 120 or the broadband connection 126.

FIG. 2A depicts an example implementation of the system of FIG. 1 in which the system comprises a basestation such as, for example, a macrocell basestation. In FIG. 2A, the system 100 includes a satellite reception assembly 202 comprising subassembly 204, the module 108, the module 124, and a basestation 206. In the example implementation shown in FIG. 2A, the basestation 206 may be an implementation of the module 106 described above. In the example implementation shown in FIG. 2A, the modules 108 and 124 may be as described above, with the module 108 utilizing one or more protocols which may conventionally be used for interfacing a basestation to a cellular backhaul network. While the satellite reception assembly 202 shown comprises a satellite dish assembly comprising parabolic reflector and a feed horn, the satellite reception assembly is not so limited. For example, a satellite reception assembly could comprise a planar or parabolic array of antenna elements and/or receiver circuitry whose signals are combined for satellite signal reception.

The subassembly 204 may comprise, for example, an Internet Protocol LNB (IP-LNB) as described in U.S. patent application Ser. No. 13/326,125, which is incorporated herein by reference, as set forth above. In this regard, the nomenclature "IP-LNB" indicates that the subassembly 252 possesses capabilities beyond the block downconversion of received satellite signals that is performed by conventional LNBs. In the implementation of FIG. 2A, the subassembly 204 is depicted as a single physical assembly mounted to the satellite reception assembly 202. In other implementations, the subassembly 204 may comprise multiple physical assemblies, one or more of which may reside physically separate from the satellite reception assembly 202 and be connected to the satellite reception assembly 202 via one or more wired and/or wireless links.

FIG. 2B depicts an example implementation of the system of FIG. 1 in which the system comprises a basestation, such as, for example, a small-cell (e.g., femtocell or picocell) base station. In FIG. 2B, the system 100 comprises a satellite reception assembly 220, a gateway 214, and a subassembly 222 which, in turn, comprises an IP-LNB module 224, a cellular basestation module 226, the routing module 124, and an Ethernet transceiver module 228. The various modules of the subassembly 222 may reside in one or more housings, on one or more printed circuit boards, and/or one or more integrated circuits (e.g., one or more silicon dice). Although the various modules of subassembly 222 are depicted as being part of the satellite reception assembly (or "outdoor unit"), in other implementations all or a portion of the modules 224, 226, 230, and 228 may be part of the gateway 214 (or "indoor unit").

The IP-LNB module 224 may be an implementation of the module 104 described above and may be as described in U.S. patent application Ser. No. 13/326,125, which is incorporated herein by reference, as set forth above. Functions performed by the IP-LNB module 224 may comprise, for example, downconverting received satellite signals, demodulating received satellite signals, channelizing received satellite signals, and/or encapsulating data recovered from received satellite signals into IP packets.

The routing module 230 may be an implementation of the module 124 described above. Functions performed by the module 230 may comprise routing of data between the IP-LNB module 224, the cellular basestation module 226, and the Ethernet transceiver module 228. Although an implementation in which the routing module supports IP-based routing is described herein, any suitable protocols (e.g., Ethernet, PCIe, USB, etc.) can be utilized for communication of data between modules 224, 226, 230, and 228.

The Ethernet transceiver module 228 may be an implementation of the module 108 described above. Functions performed by the module 228 may comprise encapsulation of data from the module 230 into Ethernet frames and transmission of the Ethernet frames onto the cable(s) 114 in accordance with Ethernet protocols. Additionally or alternatively, functions performed by the module 228 may comprise reception of Ethernet frames via the cable(s) 114, processing of the Ethernet frames to recover data carried therein (e.g., IP packets), and conveyance of the recovered data to the routing module 230.

The small-cell basestation module 226 may be an implementation of the module 106 described above. Such functions may comprise communication with one or more cellular devices that are within communication range of the basestation 226. The basestation module 226 may be operable to receive data via one or more cellular connections 116, process the received data, and output the data to the routing module 230 in the form of one or more IP packets. Similarly, the small-cell basestation 226 may be operable to receive IP packets from the routing module 230, process the IP packets, and transmit signals carrying the IP packets (or their contents) via one or more connections 116. An exemplary implementation of the basestation module 226 is described below with respect to FIG. 3.

The gateway 214 may be an implementation of module 112 described above. Functions performed by the gateway 214 may comprise reception, processing, and transmission of data. The gateway 214 may transmit and/or receive data to and/or from the system 100 (via cable(s) 114), the WAN 120 (via WAN connection 126), and/or one or more client devices 122 (via one or more links 234). For data from the module 228 to a client device 122, the gateway 214 may recover the data from Ethernet frames received over the cable(s) 114 and output the data to the client device 122. For data from the client 122 and/or gateway 114 to the module 228, the gateway 214 may encapsulate the data in one or more Ethernet frames and output the frames onto the cable(s) 114. For data between the WAN 120 and the module 228, the gateway 214 may perform OSI layer-2 switching and/or OSI layer-3 routing. Although the implementation shown in FIG. 2B uses wired links between the gateway 214 and module 228, and between the gateway 214 and WAN 120, other may utilize wireless links. Although the gateway 214 is depicted as separate from the system 100, in other implementations at least a portion of the system 100 may reside in and/or be implemented by the gateway 214.

In operation, one or more cellular devices within the coverage area of the basestation module 226 may connect to the basestation module 226 and request data (e.g., audio and/or video content). In instances that the requested data is not available via satellite, the data may be retrieved via the WAN 120 and the gateway 214. In instances that the requested data is available via satellite, however, the data may be conveyed from the IP-LNB module 224 to the basestation module 226 via the routing module 230. Thus, the data may be delivered to the cellular devices without having to traverse the WAN 120. In such instances, the only load on the WAN 120 resulting from delivering the data to the cellular devices may be a small amount of traffic for implementing conditional access (CA) and/or billing the cellular devices. Moreover, even this CA and/or billing traffic may be eliminated if an out-of-band connection to a CA and/or billing server is available (e.g., the basestation can wirelessly connect to the CA and/or billing server).

Figure 3:
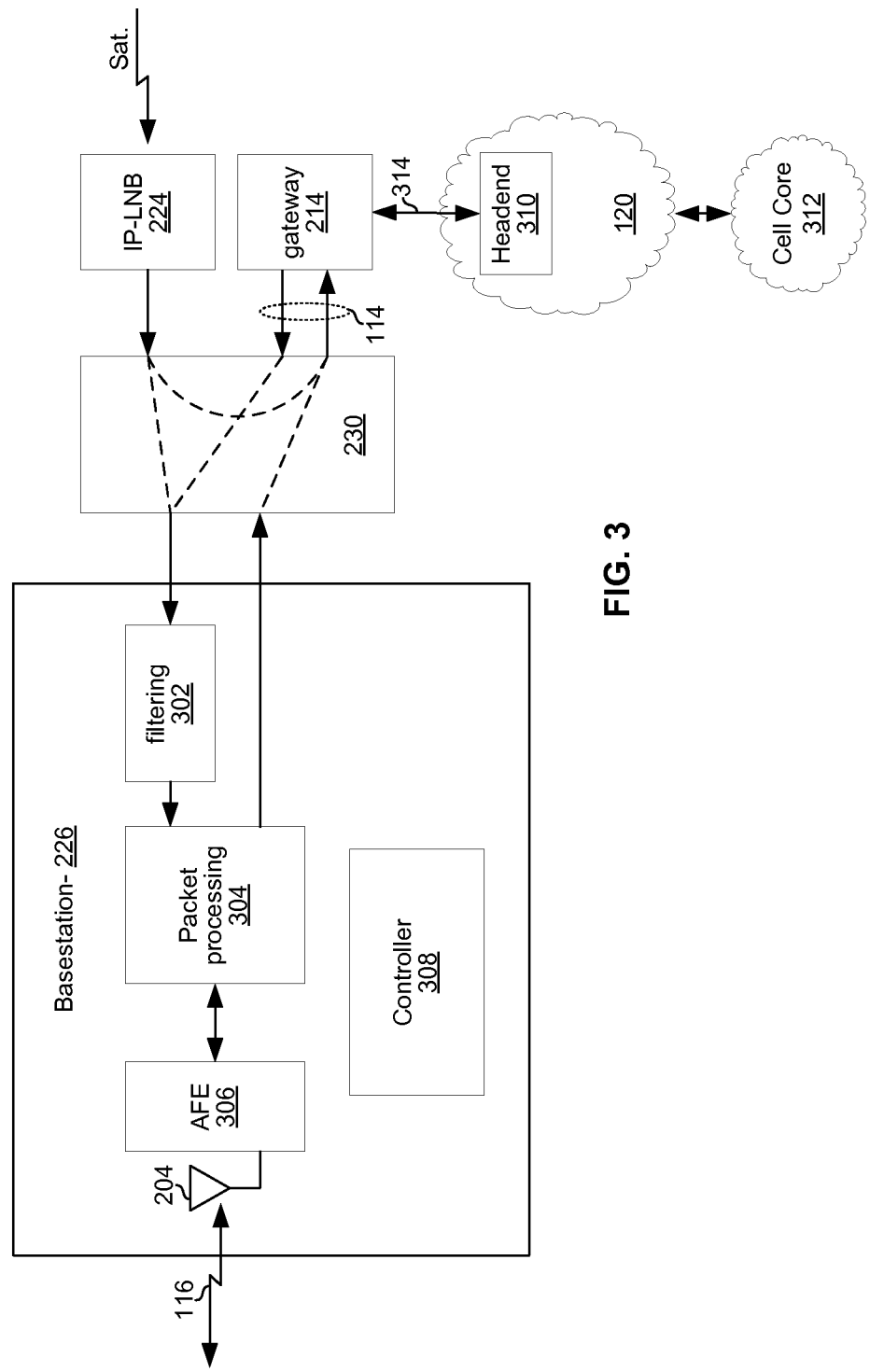
FIG. 3 depicts another example implementation of the system of FIG. 1.

FIG. 3 depicts another example implementation of the system of FIG. 1. Shown in FIG. 3 are the routing module 230, the IP-LNB module 224, and the gateway 214 described above. Also shown are: a headend 310 and cellular core network 312 which are part of the WAN 120; and example components of the basestation 226 which include an analog front end (AFE) 306, packet processing module 304, port filtering module 302, and controller 308.

The controller 308 may be operable to control operation of the basestation 226. This may comprise, for example, executing an operating system and generating signals which may control operation of various modules of the basestation 226.

The packet processing module 304 may be operable to encapsulate, decapsulate, encode, decode, and/or otherwise process packets in accordance with communication protocols being used for communicating with the routing module 230 and in accordance with communication protocols being used for communicating via the connection(s) 116. In this manner, data received from the routing module 230 may be made suitable for communication via the connection(s) 116 and data received via the connection(s) 116 may be made suitable for communication to the routing module 230.

The AFE 204 may perform upconversion, modulation, amplification, digital-to-analog conversion, and/or any other suitable processing functions for receiving digital data from the packet processing module 304 and generating RF signals to communicate the data wirelessly. Similarly, the AFE 204 may perform downconversion, demodulation, amplification, analog-to-digital conversion, and/or any other suitable processing functions for recovering data from received RF signals and conveying the data to the packet processing module 304.

The traffic filtering module 302 may be operable to inspect traffic input to the basestation 226 from the routing module 230 to determine whether the traffic is approved for communication via the cellular connection(s) 116. The filtering module 302 may, for example, comprise a table of authorized IP addresses, TCP/UDP ports, and/or some other identifiers for determining which traffic is authorized. In an example implementation, an identifier of the IP-LNB module 224 may be programmed into the filtering module 302 after authenticating the IP-LNB module 224. Thereafter, the filtering module 226 may accept traffic from the IP-LNB module 224 as well as traffic from the cellular core network 312 (received via the headend 310 and gateway 214). Traffic not identified as coming from either of these sources may be dropped.

The headend 310 may be operable to provide the gateway 214 with access to the WAN 120 (and thus the cellular core network 312). In an implementation, the headend 310 may be operable to detect and log traffic communicated over the WAN connection 314. For example, the headend 310 may keep track of the amount of traffic identified as being associated with the IP-LNB module 224, the basestation 226, and/or the cellular core network 312. Such information may be utilized, for example, for billing cellular customers, cellular providers, satellite customers, and/or satellite providers for use of the connection 314.

Figure 4:
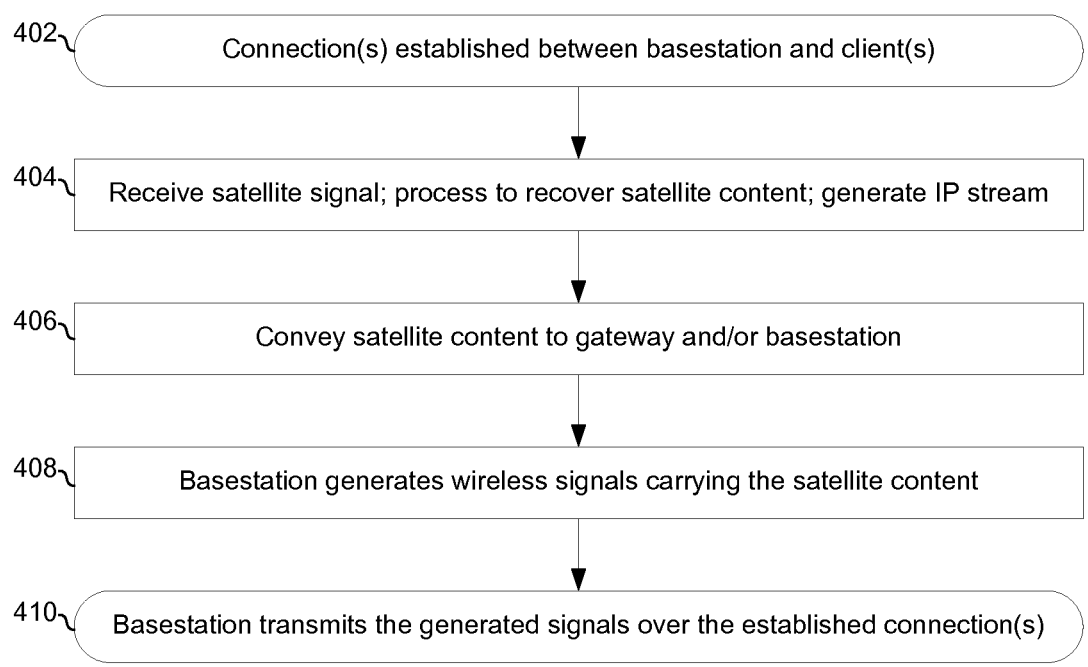
FIG. 4 is a flowchart illustrating example steps performed by a system operable to convey satellite data to mobile devices.

FIG. 4 is a flowchart illustrating example steps performed by a system operable to convey satellite data to mobile devices. The steps begin with step 402 in which one or more wireless connections 116 are established between a basestation (e.g., 206 or 226) and one or more mobile devices (e.g., device 110). The establishment of the connection may comprise, for example, authenticating that the one or more mobile devices are authorized to receive satellite data. In step 404, a satellite signal is received (e.g., via module 204 or 224), processed to recover data carried therein. The recovered data is then encapsulated in an IP packet stream. In step 406, the IP packet stream carrying the satellite data is conveyed to a gateway (e.g., via routing module 124 and Ethernet transceiver module 128) and/or to the basestation. Which data is conveyed to the gateway and which data is conveyed to the basestation may depend on which data has been requested by each and/or the service level agreements that are in place. In step 408, the basestation processes the satellite data conveyed to it (e.g., by the routing module 230) to generate one or more signals which carry the satellite data and are suitable for transmission via the established wireless connections 116. In step 410, the signal(s) generated in step 408 are transmitted via the connection(s) 116.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for mobile delivery of broadcast content.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A satellite reception assembly comprising a routing module and a basestation module, wherein:
   said routing module is operable to route packets between said basestation module and a satellite subscriber gateway;
   said routing module comprises a filtering module operable to drop packets that arrive via said satellite subscriber gateway from a network that is not a network of a cellular provider associated with said basestation module; and
   said basestation module is operable to transmit packets from said routing module in accordance with one or more wireless protocols.

2. The satellite reception assembly of claim 1 wherein said one or more wireless protocols comprise one or more of cellular, WiGig, WiMAX, and IEEE 802.11 protocols.

3. The satellite reception assembly of claim 1, comprising a parabolic reflector and a feed horn.

4. The satellite reception assembly of claim 1, wherein said satellite reception assembly is adapted for installation at a satellite subscriber premises.

5. The satellite reception assembly of claim 1, wherein said basestation module is a cellular basestation module.

6. The satellite reception assembly of claim 1, wherein said satellite reception assembly is adapted for mounting to a cellular tower.

7. The satellite reception assembly of claim 1, wherein said satellite reception assembly is connected to said satellite subscriber gateway via an Ethernet physical layer connection.

8. The satellite reception assembly of claim 1 wherein:
   said satellite reception assembly comprises a satellite receive module; and
   said routing module is operable to route satellite content received via said satellite receive module among said satellite receive module, said basestation module, and said satellite subscriber gateway.

9. The satellite reception assembly of claim 8, wherein said routing module is operable to packetize said satellite content into Internet Protocol (IP) packets.

10. The satellite reception assembly of claim 1, wherein:
    said satellite subscriber gateway is operable to route traffic between said satellite reception assembly and a wide area network connection terminated at said satellite subscriber gateway; and
    said packets do not traverse said wide area network connection when routed by said routing module.

11. A method comprising:
    in a satellite reception assembly comprising a routing module and a basestation module:
    routing, by said routing module, packets between said basestation module and a satellite subscriber gateway;
    dropping, by a filtering module of said routing module, packets that arrive via said satellite subscriber gateway from a network that is not a network of a cellular provider associated with said basestation module; and
    transmitting, by said basestation module, packets from said routing module in accordance with one or more wireless protocols.

12. The method of claim 11 wherein said one or more wireless protocols comprise one or more of cellular, WiGig, WiMAX, and IEEE 802.11 protocols.

13. The method of claim 11, wherein said satellite reception assembly is installed at a satellite subscriber premises.

14. The method of claim 11, wherein said basestation module is a cellular basestation module.

15. The method of claim 11, wherein said satellite reception assembly is mounted to a cellular tower.

16. The method of claim 11, wherein said satellite reception assembly comprises a satellite receive module, and the method comprises:
    routing, by said routing module, satellite content received via said satellite receive module among said satellite receive module, said basestation module, and said satellite subscriber gateway.

17. The method of claim 16, comprising packetizing, by said routing module, said satellite content into Internet Protocol (IP) packets.

18. The method of claim 11, comprising:
routing, by said satellite subscriber gateway, traffic between said satellite reception assembly and a wide area network connection terminated at said satellite subscriber gateway, wherein, said packets do not traverse said wide area network connection when routed by said routing module.

* * * * *